US008350758B1

(12) United States Patent
Parvizi et al.

(10) Patent No.: US 8,350,758 B1
(45) Date of Patent: Jan. 8, 2013

(54) SYSTEMS AND METHODS FOR INDOOR GEOLOCATION BASED ON YIELD OF RF SIGNALS

(75) Inventors: Parviz Parvizi, Cambridge, MA (US); Mohammad Heidari, Worcester, MA (US)

(73) Assignee: Lighthouse Signal Systems LLC, Cambridge, MA (US)

( * ) Notice: Subject to any disclaimer, the term of this patent is extended or adjusted under 35 U.S.C. 154(b) by 244 days.

(21) Appl. No.: 12/896,417

(22) Filed: Oct. 1, 2010

Related U.S. Application Data

(60) Provisional application No. 61/247,879, filed on Oct. 1, 2009.

(51) Int. Cl.
*G01S 3/02* (2006.01)
(52) U.S. Cl. .................. 342/452; 342/451; 342/464
(58) Field of Classification Search .......... 342/451–453, 342/463
See application file for complete search history.

(56) References Cited

U.S. PATENT DOCUMENTS

| | | | |
|---|---|---|---|
| 7,411,549 B2 * | 8/2008 | Krumm et al. ................ 342/464 |
| 2004/0061646 A1 * | 4/2004 | Andrews et al. ............. 342/463 |
| 2012/0056785 A1 * | 3/2012 | Jovicic et al. ................ 342/450 |
| 2012/0066035 A1 * | 3/2012 | Stanger et al. ............ 455/456.2 |

* cited by examiner

*Primary Examiner* — Jack W Keith
*Assistant Examiner* — Fred H Mull
(74) *Attorney, Agent, or Firm* — Goodwin Procter LLP

(57) ABSTRACT

Systems and methods are disclosed herein for determining a user's location within an indoor environment. In particular, the system receives a location request including a set of radio frequency signal data collected by a mobile device inside of an indoor environment. Using this data set, the system first selects a map from a plurality of maps stored in a map database. The system then processes the data to identify the user's location on the selected map. The system uses yield information associated with the received signals in determining the map that the user is on, the user's location on the map, or both the map and the user's location to filter out transient signals and identify those signals that are reliably indicative of the user's location.

30 Claims, 11 Drawing Sheets

SYSTEMS AND METHODS FOR INDOOR GEOLOCATION BASED ON YIELD OF RF SIGNALS

CROSS-REFERENCE TO RELATED APPLICATIONS

This application claims the benefit of U.S. Provisional Application Ser. No. 61/247,879, filed Oct. 1, 2009, the entire contents of which are incorporated herein by reference.

BACKGROUND OF THE INVENTION

Recently, the problem of determining the location of a person or object in indoor environments has gained tremendous attention. The applications of such systems include locating public safety officers in indoor environments, locating valuable objects or instruments in hospitals, and monitoring youngsters and elderly people in indoor environments. The main two approaches to positioning are time-of-arrival (TOA) techniques and received-signal-strength (RSS) techniques. In systems using TOA techniques, a mobile station broadcasts an impulse (a very wideband signal), and all the fixed stations, with known coordinates, respond to it. From that response, the mobile station or a central server can determine the mobile station's distance from each fixed reference point. The location of the mobile terminal is then calculated using trilateration or triangulation. In systems using RSS techniques, the signal strength of a known reference is used to find the distance between a fixed station and a mobile station, and again the location of the mobile station is found using trilateration or triangulation. Another approach uses the signal strengths from all the nearby fixed stations to build a database of locations with their respective signal strengths. The location of an unknown mobile station is determined by fingerprinting. In such systems the new signal strength measurements can be compared to the database and the best matching location can be found from the database.

Traditional location techniques such as GPS are shown to be unsuccessful in indoor environments because physical barriers degrade GPS signals. GPS relies on accurate distance estimation between the fixed station (GPS satellite) and mobile station (the receiver). This distance is obtained accurately if and only if the link between the two stations is not blocked by any other objects and line-of-sight (LOS) conditions exist between the transmitter and receiver. In indoor environments, the GPS signals are blocked by different objects, so they are attenuated to such an extent that they are either not detectable by the receiver or the distance estimation process yields highly inaccurate distance.

TOA techniques in indoor environments also suffer from the same problem. In indoor environments, the signals between stations are usually blocked by interior objects in the indoor environment, so the line-of-sight component of the signal is not detectable. This problem is referred to as the non-line-of-sight (NLOS) problem in positioning literature. The NLOS condition is shown to be the most problematic cause of inaccurate indoor location for TOA techniques. Therefore, it is suggested that for indoor environments, the performance of the RSS technique is superior to the performance of the TOA technique.

In RSS techniques that use the signal strength to determine the distance between the stations, the signal strength is usually related to the distance via a path-loss model which predicts the received signal strength at any specific distance based on the transmit power, signal attenuation gradient (known as path-loss exponent), number of attenuators and their respective attenuation level, and the distance to the stations. Such path-loss models highly depend on the correct and stable measurement of the signal strength. However, it is also shown that signal power changes rapidly over time. The stations in indoor environments suffer even more from this change as they face lots of obstacles within indoor environments. Therefore, such RSS systems also have found limited use for indoor positioning.

SUMMARY OF THE INVENTION

Therefore, there exists a need in the art for a method of indoor geolocation that is able to exclude signal sources that are transient in nature, isolating those sources that are more reliably present. In one aspect of the invention, a method for determining a user's location in an indoor environment includes receiving a location request along with a set of radio frequency (RF) signal data collected by a mobile device in an indoor environment, using this data to select a map from a plurality of maps stored in a map database, and processing the data to identify the user's location on the selected map. The method uses the yield information associated with the received signals in determining either the map that the user is on, the user's location on the map, or both the map and the location. The yield of a signal is a measure of how often it is detected over a period of time or how many times it is detected over a number of observations during signal monitoring.

In one embodiment, selecting a map from a plurality of maps includes filtering the data received to obtain a subset of data with preferred signal characteristics. Then, the system compares the filtered subset of received data to a set of maps in the database, in which each map has a set of associated filtered signal data. By comparing the filtered subset of received data to the map data sets, the system can determine from which map the received signal data originated.

In one embodiment, filtering the received data set and the map data set is based on the average signal strength of the received signals. In another embodiment, a score for each map is calculated when comparing the filtered received data to the filtered map data. The score is based on the number of filtered received signals that are also in the filtered signals of each map.

In another embodiment, the method uses the geographic region of the mobile device to narrow down a set of maps in the map database to a subset of maps associated with that geographic region. The received signal data is then compared to this subset of maps only, rather than all maps in the map database.

In another embodiment, the method's determination of where the user is on the selected map includes the following steps: filtering the received data, comparing the received data to the selected map's data set of RF signal information at a plurality of locations (map points), determining a variable number of most probable map points at which the received data was collected, and determining the user's location through interpolation of these most probable map points. In one embodiment, the method including using at least one cost function in comparing the received signal data to the map's data at each map point. In one embodiment, these cost functions are used to produce the set of most probable points on the map at which the user may be located. In one embodiment, the system assigns weights to the most possible map points to use in the interpolation of the most possible map points.

In another embodiment, the method includes using a neural network to process the received data and identify the user's location on the map.

According to another aspect, the invention relates to a non-transitory computer readable medium storing computer executable instructions, which, when executed by a processor, cause the processor to carry out the methods described above.

According to another aspect, the invention relates to a system for determining a user's location within an indoor environment comprising a database and a processor. The database stores a plurality of maps in which each map contains a plurality of map points with radio frequency (RF) fingerprint data. The processor is configured to receive a location request along with a set of RF signal data collected by a mobile device in an indoor environment, use this data to select a map from a plurality of maps stored in the map database, and process the data to identify the user's location on the selected map. The system uses the yield information associated with the received signals in determining either the map that the user is on, the user's location on the map, or both the map and the location.

In one embodiment, the system further comprises at least a receiver or transceiver configured to receive a set of radio frequency signals. In one embodiment, the receiver or transceiver are co-located with the processor and database within a mobile device. In another embodiment, the receiver or transceiver is physically separated from the processor and database. In this embodiment, the system includes a second processor co-located with the receiver or transceiver that initiates the transmission of the location request to the first processor via a wireless communication link.

In one embodiment, the system further comprises a memory for storing a graphical user interface for presenting the location to the user. The graphical user interface can further be configured to accept a corrected location from the user.

BRIEF DESCRIPTION OF THE FIGURES

The methods and systems may be better understood from the following illustrative description with reference to the following drawings in which.

DETAILED DESCRIPTION

To provide an overall understanding of the invention, certain illustrative embodiments will now be described, including systems and methods for indoor geolocation. However, it will be understood by one of ordinary skill in the art that the systems and methods described herein may be adapted and modified as appropriate for the application being addressed and that the systems and methods herein may be employed in other suitable applications, and that such other additions and modification will not depart from the scope thereof.

Figure 1A:
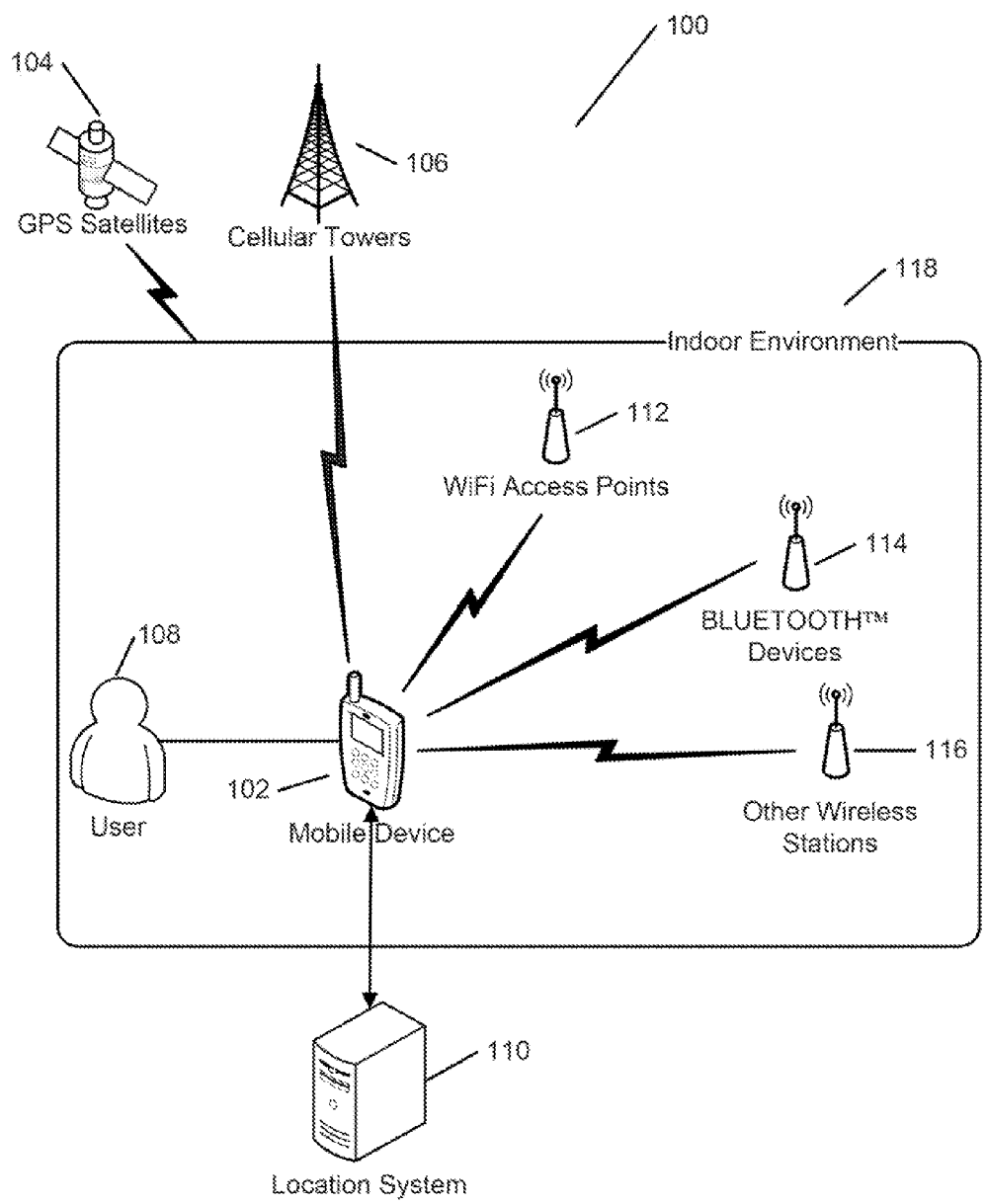
FIG. 1A is a schematic diagram of an indoor geolocation system according to an illustrative embodiment of the invention.
Figure 1B:
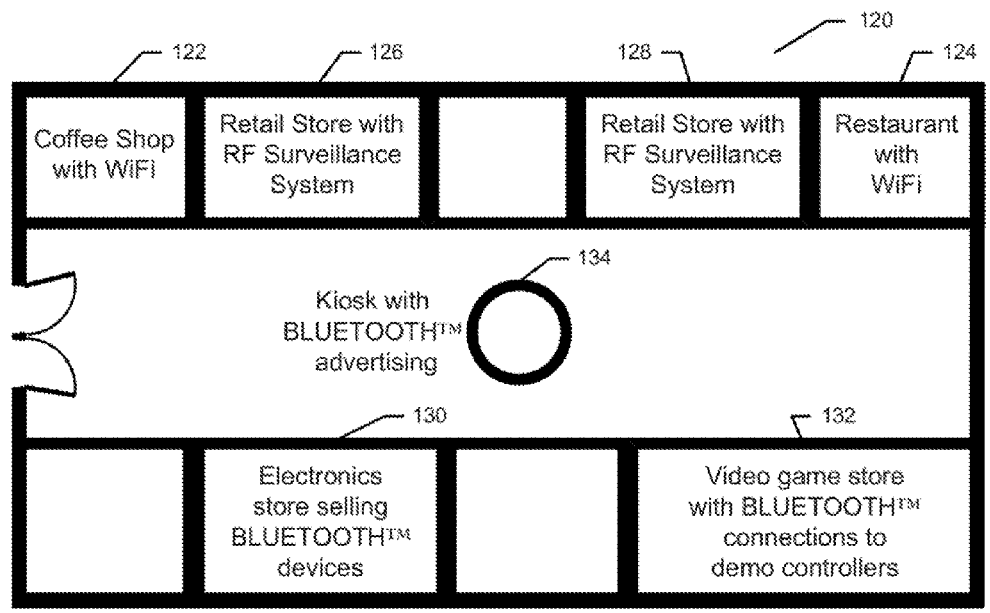
FIG. 1B is a map of a first illustrative indoor environment, i.e. a shopping mall, in which the invention would be useful according to an illustrative embodiment of the invention.
Figure 1C:
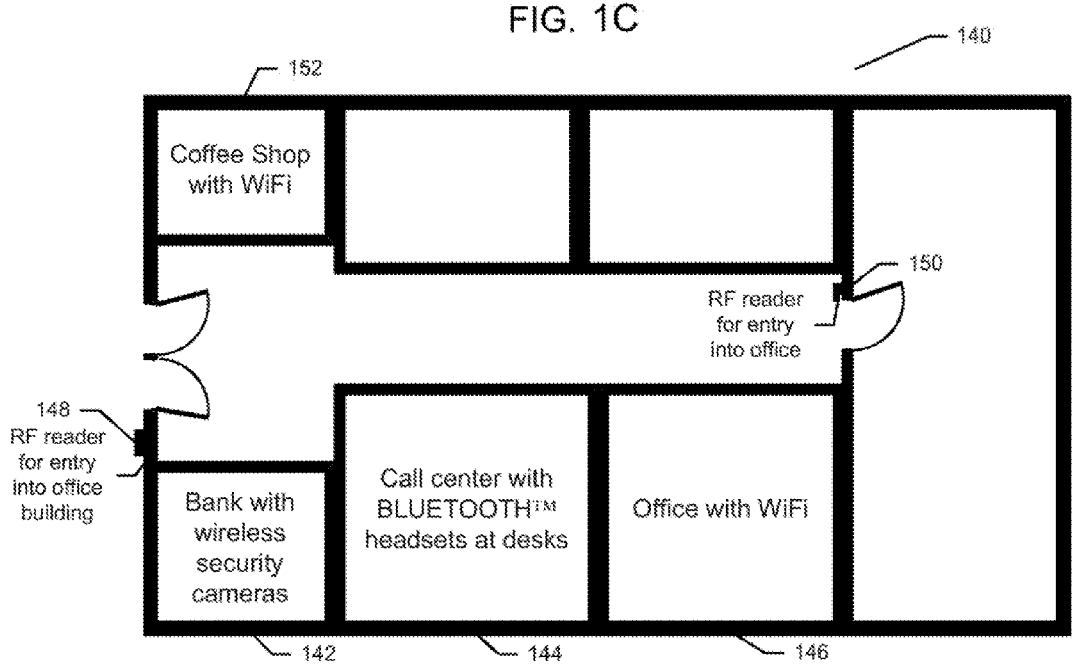
FIG. 1C is a map of a first illustrative indoor environment, i.e. an office building, in which the invention would be useful according to an illustrative embodiment of the invention.

FIG. 1A is a schematic diagram of a system 100 for indoor geolocation, i.e. determining one's location in an indoor environment, according to an illustrative embodiment of the invention. FIG. 1B and FIG. 1C are examples of maps of indoor environments in which the system 100 may be used. The indoor geolocation system 100 includes a mobile device 102 and a location system 110. The user 108 uses the mobile device 102 to determine his location within an indoor environment 118. The mobile device 102 enables this by monitoring identifiable wireless radio frequency (RF) signals received over a period of time and transmitting the wireless signal data to the location system 110. The data collected by the mobile device 102 includes, for each signal detected, the signal source's identification information, such as a MAC or EUI identifier or the signal's frequency; the signal's average signal strength; the standard deviation of its signal strength; and its yield, which is a measure of how often the signal is detected over a given time period, such as 60 seconds, or how many times the signal is detected over a number of observations, such as 60 observations. When monitoring, the mobile device 102 collects a plurality of samples, or "polls", of the detectable signals. For example, one instance of signal monitoring may contain 60 polls over a duration of 60 seconds, with one poll taken per second, though the frequency of polling and the overall time during which signals are polled may vary without departing from the scope of the invention. Yield may be calculated as a percentage of polls in which the signal was detected, the number of polls in which the signal was detected, the fraction of polls in which the signal was detected, or the number of polls in which the signal strength was above a given power threshold, such as −90 dB. From this information, the location system 110 determines the location of the mobile device 102 and transmits that location back to the mobile device 102. The mobile device 102 displays the location to the user 108 on a graphical user interface.

As depicted in FIG. 1A, wireless signals can originate from WiFi access points 112, BLUETOOTH™ devices 114, and/or other RF wireless stations 116, which may include ZIGBEE™ devices, RFID readers, or any such device which emits a wireless signal, if the mobile device is equipped with an appropriate receiver. Collectively, these wireless signal sources will be referred to as "signal sources." The signal sources 112-116 are already present in the indoor environment 118, so the system uses existing infrastructure and no new infrastructure is needed. The mobile device also may receive signals from cell towers 106 and/or GPS satellites 104. Cellular towers 106 can provide location information using triangulation or other methods; however, it is challenging to precisely determine one's location based on cell phone triangulation. While GPS satellites 104 send signals that may be received by the mobile device 102 while it is outside of the indoor environment 118, GPS signals do not usually effectively reach such devices inside most indoor environments. Therefore, rather than relying solely on cellular and GPS signals, the system 100 as described herein will also utilize WiFi, BLUETOOTH™, and other RF wireless signals within the indoor environment 118 for precise, reliable indoor geolocation.

The mobile device 102 is depicted as a mobile wireless device such as a cell phone or smart phone. However, it may be any portable device, such as a laptop, notebook, tablet computer, palm-sized computer, or any electronic device with capability to receive wireless signals.

FIGS. 1B and 1C are two examples of maps of indoor environments inside of which the user 108 could use the indoor geolocation system 100. FIG. 1B depicts a map of a shopping mall 120 containing a typical blend of retail stores, eateries, and kiosks. The shopping mall 120 includes a variety of wireless signals that may be present within a typical mall, which can be used by the mobile device 102 and location system 110 to determine the location of the mobile device 102 within the mall. The coffee shop 122 and restaurant 124 both provide WiFi access to customers. These WiFi signals, identified by the MAC addresses encoded therein of their source devices, can be received by the mobile device 102 from FIG. 1A when the mobile device is within range of the signal sources.

The retail stores 126 and 128 utilize an electronic article surveillance system using RF signals to prevent theft. RF article surveillance systems typically have a transmitting antenna on one side of a doorway and a receiving antenna on the other. When a product with an active RFID tag passes through the doorway, the tag responds to the signal sent from the transmitter antenna and a different signal is sent by the tag. This signal from the tag is received by the receiving antenna, and store employees are alerted. Since the transmitting antenna of an RF article surveillance system is constantly emitting a signal, the mobile device 102 can detect these RF signals when within range and use its frequency band to distinguish it from other signals.

The electronics store 130 likely stocks a variety of devices emitting wireless signals. In the illustrative embodiment, the electronics store 130 is showcasing BLUETOOTH™ devices, such as headsets, computers and peripherals, television boxes, and alarm clocks. The video game store 132 also has BLUETOOTH™ technology on display, in this case video game consoles with wireless controllers used for gaming systems such as Nintendo WII™, Microsoft XBOX™, or Sony PLAYSTATION™. The BLUETOOTH™ receiver on the mobile device 102 detects these signals from the electronics store 130 and the video game store 132 when they are within range and uses their device names or other transmitted information to identify them.

The kiosk 134 uses BLUETOOTH™ advertising to send messages to customers in the area. BLUETOOTH™ advertising is a method of mobile advertising in which a transmitter sends a message to mobile devices in its vicinity asking whether the user of the mobile device would like to receive an advertisement. Should the user opt to receive the advertisement, a message, such as a text message, video clip, or animation is sent to the mobile device via the BLUETOOTH™ connection. When the mobile device 102 is within range of the BLUETOOTH™ advertising transmitter at kiosk 134, it will receive the signal and can access the typical BLUETOOTH™ identifiers such as device name of the transmitter.

FIG. 1C depicts a map of an office building 140 containing offices and several services typically found within a large office building. A person who wants to enter the office building 140 must first pass an access point equipped with an RF reader 148, also known as an RF interrogator. The rightmost office has an additional RF reader 150 restricting access to employees of that office only. These RF readers work with passive RFID tags by emitting a signal that would excite an RFID tag within range to transmit its ID back to the reader. Since the RF readers 148 and 150 are constantly emitting signals, the mobile device 102 can detect the signals when they are within range for use in indoor geolocation.

At the entry to the office building 140 is a coffee shop 152 that provides WiFi to its customers. This is similar to the coffee shop 122 in the shopping mall. A bank 142 is also at the entry to the office building. This bank uses wireless security cameras to monitor activities in the bank. Wireless security cameras often send digital signals to a receiver over wireless local area networks. The mobile device 102 can use the MAC addresses to identify the wireless security cameras and/or the receiver.

The office building 140 has a call center 144 as one of its tenants. This call center's representatives use BLUETOOTH™ headsets coupled with base stations. Similar to the electronics store 130 and video game store 132 that both emitted BLUETOOTH™ signals, the mobile device 102 can use the BLUETOOTH™ signals emitted from these headsets and base stations for indoor geolocation. Another tenant is an office with WiFi 146. The mobile device 102 can use the office's WiFi signal for indoor geolocation similarly to how it uses WiFi signal from the coffee shops 122 and 152 and the restaurant 124.

Figure 2:
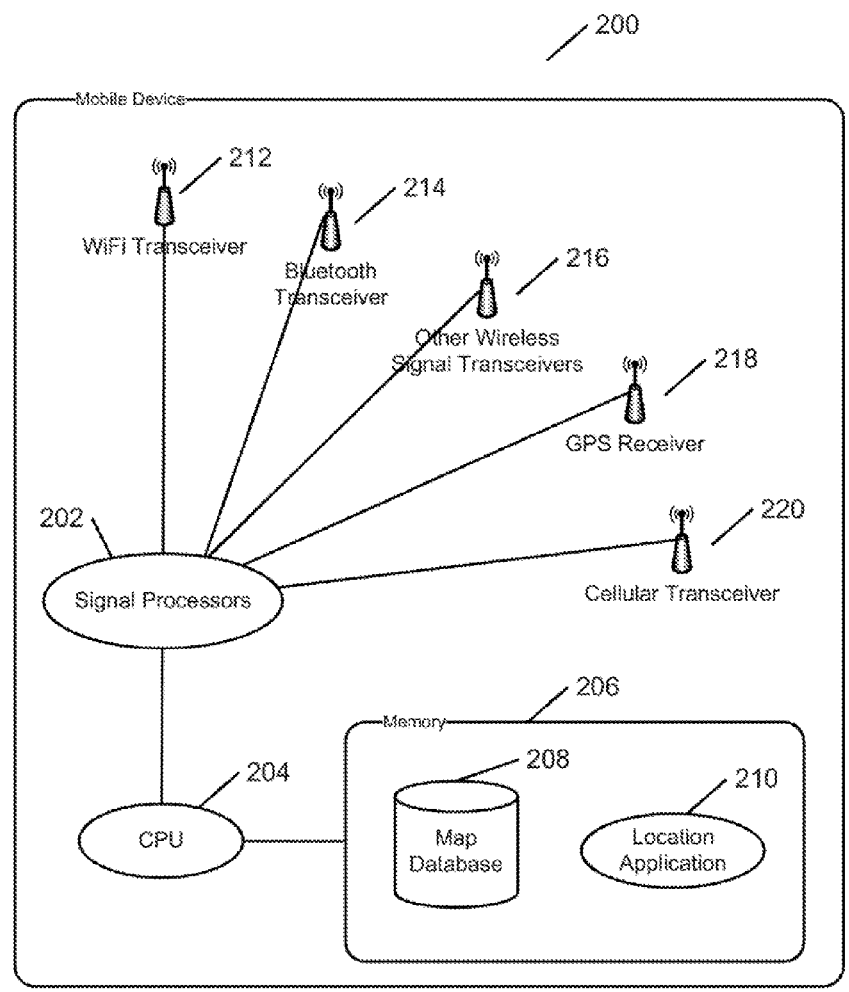
FIG. 2 is a schematic diagram of a wireless device which can be a stand-alone indoor geolocation system, according to an illustrative embodiment of the invention.

FIG. 2 is a schematic diagram of the mobile device component 200 of an alternative embodiment of an indoor geolocation system. Unlike in system 100, the mobile device 200, rather than the remote location server 110, determines the mobile device's location. To do this, the memory 206 of the mobile device 200 contains both a database of maps 208 and a location application 210 used to determine and display the mobile device's location. The location application 210 includes a graphical user interface (GUI), a locator process, and a wireless monitoring process. The map database 208 includes maps for all locations for which the indoor geolocation system has been trained. In the case of multi-floor buildings, there is a separate map associated with each floor. The mobile device 200 may only store a subset of the full map database in its memory, based on location information obtained through GPS satellites or cell towers, user input, or through other means. The map database 208 could be received and/or updated through a mobile phone provider's network, through a WiFi connection, through a physical connection to a computer, or through other means. When the location application 210 is run, though, it references a map database 208 stored within the memory 206 of the mobile device 200 rather than interacting with a remote location system.

The mobile device 200 contains several receivers and transceivers, including WiFi transceiver 212, BLUETOOTH™ transceiver 214, other wireless RF signal receivers or transceivers 216, GPS receiver 218, and cellular transceiver 220. These receivers and transceivers receive external wireless signals from signal sources 104, 106, and 112-116 depicted in FIG. 1A. The mobile device 200 also includes signal processors 202, such as analog to digital converters, digital signal processors, or any such processor required to process and characterize the wireless signals received. The mobile device 200 also includes a CPU 204, which receives information about the detected wireless signals through the signal processors 202 and executes the location application 210 stored in memory 206 to determine the location of the mobile device 200 using the signal information.

When the user 108 runs the location application 210, the mobile device 200 collects data over a period of time from the wireless signals it detects within range using the transceivers 212-218 to obtain for each signal detected the source signal's identification information, such as a MAC or EUI identifier or the signal's frequency; its average signal strength; its standard deviation of the signal strength; and its yield, as defined above. Suitable periods of time include, without limitation, 10 seconds, 20 seconds, 30 seconds, 40 seconds, 50 seconds, or 60 seconds. The location application then processes the properties of the signal according to the methodology described below in relation to FIG. 5 through FIG. 7 to determine and output the user's location on a display of the mobile device through the graphical user interface (GUI) provided by the location application.

Figure 3:
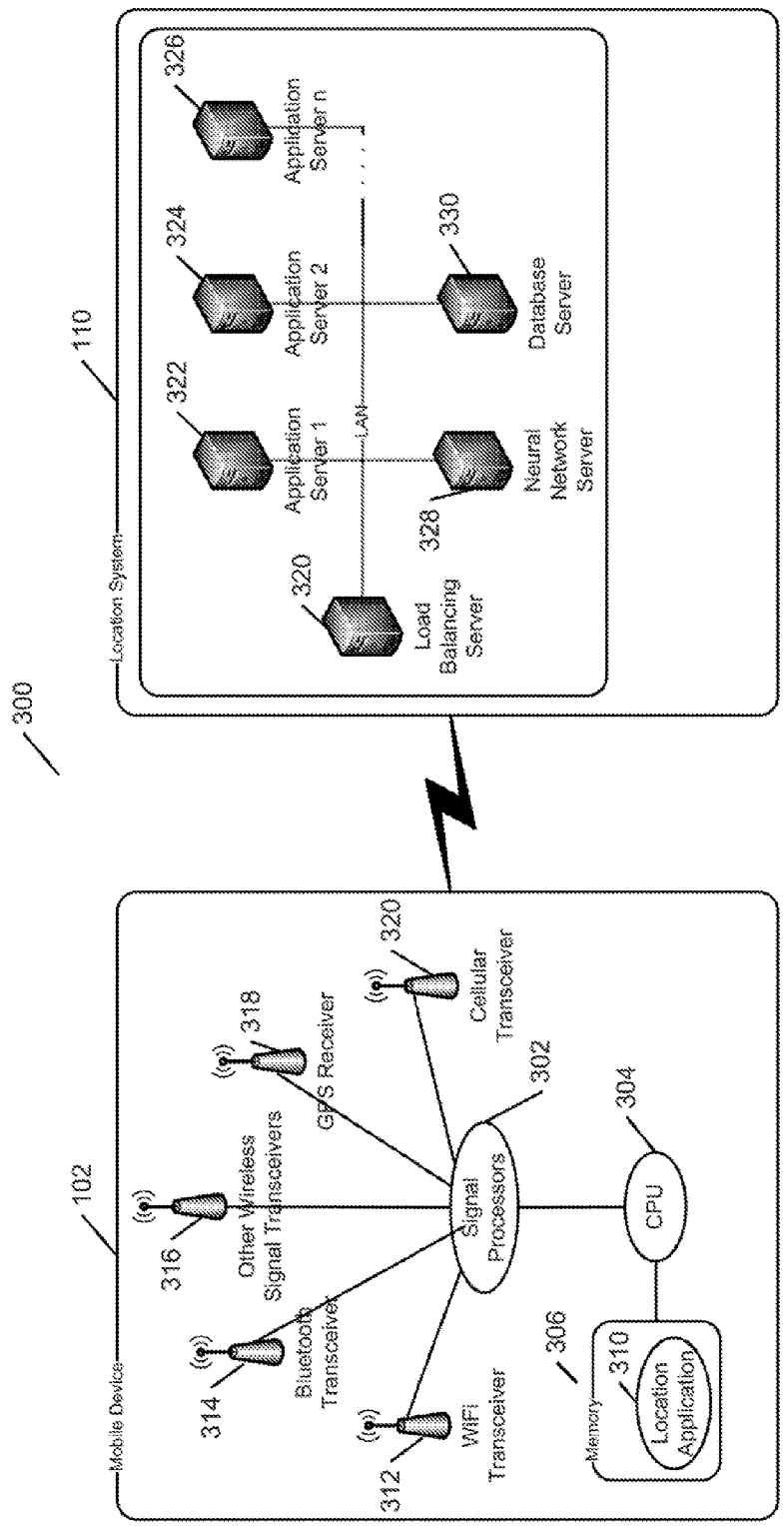
FIG. 3 is a schematic diagram of a client-server architecture-based indoor geolocation system, according to an illustrative embodiment of the invention.

FIG. 3 is a schematic diagram of an alternative indoor geolocation system 300, according to an illustrative embodiment of the invention similar to the system of FIG. 1, in which the remote location system 110 determines the location of the mobile device 102 and transmits the location to the mobile device for display. The mobile device 102 is similar to mobile device 200, except the mobile device 102 does not have a map database in its memory, and the location application 310 on the mobile device 102 does not include the locator process to determine the location of the mobile device 102. The mobile device includes a WiFi transceiver 312, BLUETOOTH™ transceiver 314, other wireless signal transceivers 316, GPS receiver 318, and cellular transceiver 320 similar to receiver/transceivers 212-220 in mobile device 200 of FIG. 2. The mobile device 102 also includes signal processors 302, which handle the outputs of these receivers/transceivers in the same fashion as the signal processors 202.

The location application 310 in mobile device 102 includes computer executable instructions for displaying a GUI in the display of the mobile device, accepting input from the user 108 via the GUI, monitoring the available wireless signals 104, 106, and 112-116, sending the data outputted from the signal processors 302 to the location system 110, accepting the output from the location system 110, and displaying the location on the mobile device 102 to the user 108 via the GUI.

The location system 110 accepts data sent from the mobile device 102 from the monitoring of the signal sources 112-116. The monitoring results for each signal include the source signal's identification information, such as a MAC or EUI identifier or the signal's frequency; its average signal strength; its standard deviation of the signal strength; and its yield.

The location system 110 includes a variety of servers: application servers 322-326, which perform the analysis of the data received; neural network server 328, which takes the processed data output by one or more application servers and uses a neural network to determine the location of the mobile device; database server 330, which stores databases used by the other servers, such as a database of all possible maps; and load balancing server 320, which balances the processing load between the servers, particularly application servers 322-326. Each of the servers is attached to the local area network (LAN) connecting the components of the location system 110. Once the location system 110 has determined the location of the mobile device, the result is sent back to the mobile device 102 to be displayed to the user 108.

Figure 4:
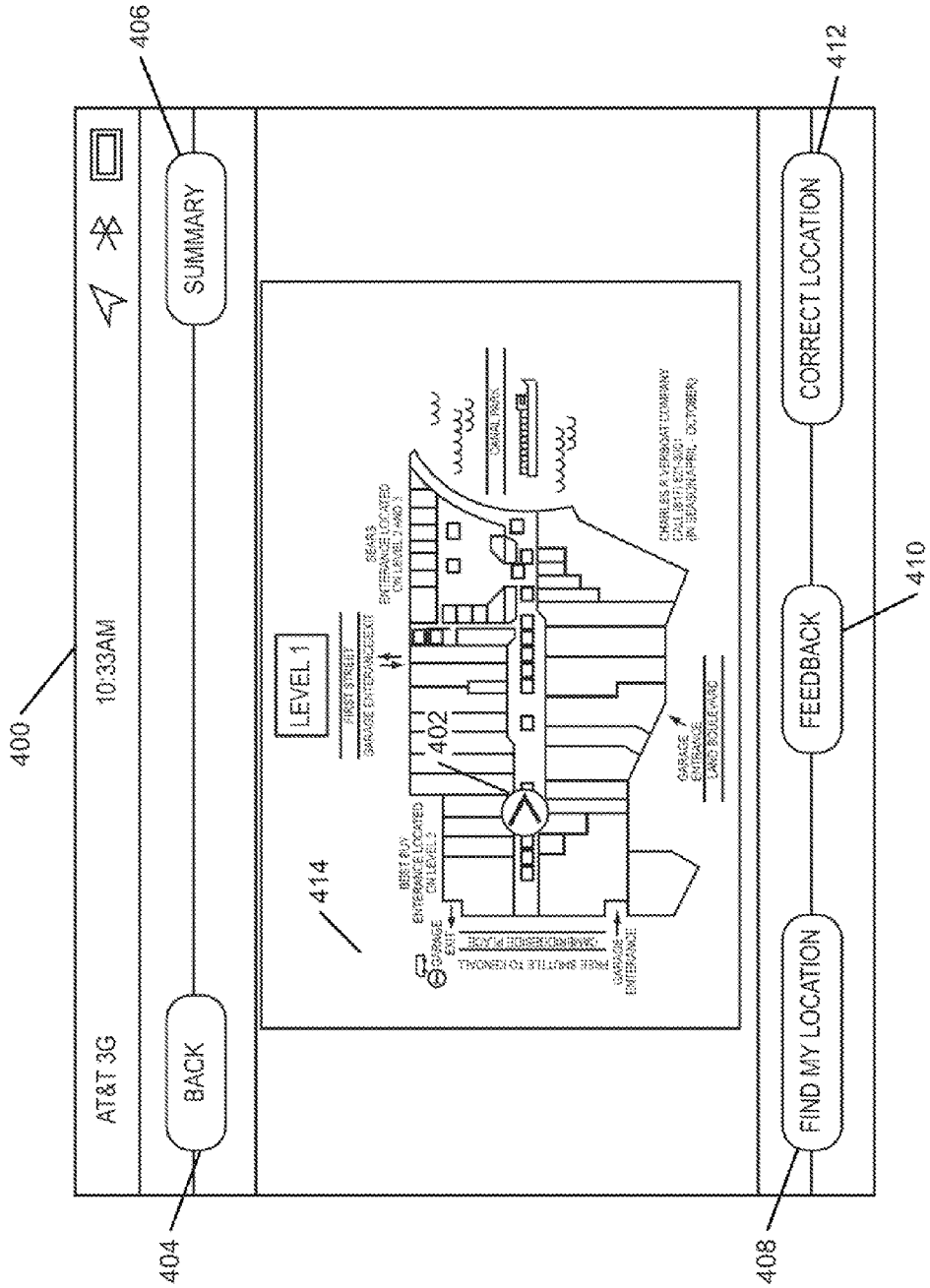
FIG. 4 is a screenshot of a graphical user interface, suitable for displaying the user's location on a map, according to an illustrative embodiment of the invention.

FIG. 4 is a screenshot of a graphical user interface suitable for displaying the user's location on a map, according to an illustrative embodiment of the invention. The screen of the mobile device 400 shows the output to the user 108 using map 414. The current location of the mobile device 102 or 200, obtained using either location system 110 or location application 210, respectively, is shown by the circled arrow 402 on the map 414 of the indoor environment the user 108 is in, in this case Floor 1 of the Cambridgeside Galleria located in Cambridge, Mass. The "Back" button 404 returns the display of the mobile device to the main application menu screen. The "Summary" button 406 displays a summary of the signal source data received. The "Find My Location" button updates the location without returning to the main menu by instructing the location application 210 or 310 on the mobile device 200 or 102, respectively, to find and display his location.

The user 108 may choose to provide feedback on accuracy of the location he was given. The user 108 can click the "Feedback" button 410, which allows him to enter the accuracy of the returned location 402 on a set scale. This may open a new screen or may cause the scale to appear over the map. Alternatively, the user 108 may manually indicate his position on the map 414 and then click the "CorrectLocation" button, which enters the corrected location. These features are discussed in greater detail with respect to the online training method in FIG. 8.

Figure 5:
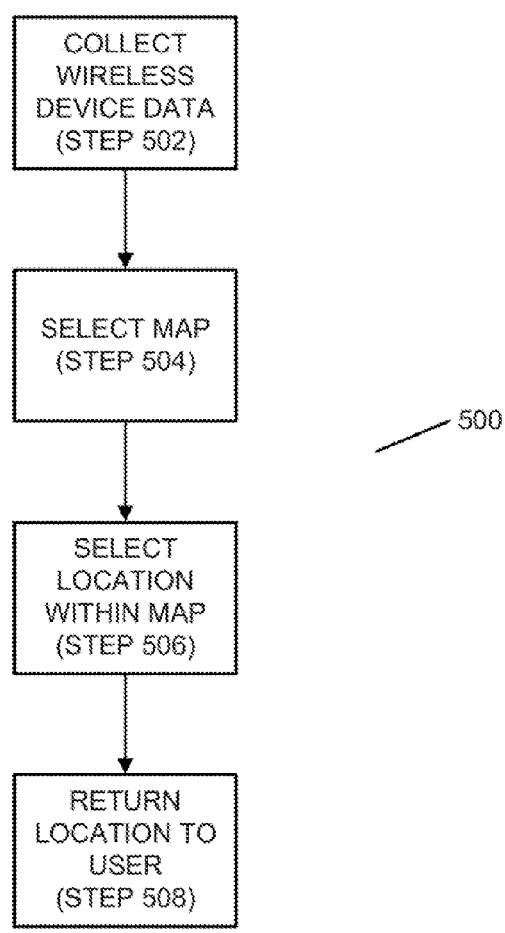
FIG. 5 is a flowchart for a method for indoor geolocation, according to an illustrative embodiment of the invention.

FIG. 5 is a flowchart for a method for indoor geolocation, according to an illustrative embodiment of the invention. The method 500 begins with the mobile device 200 or 102 monitoring all detectable wireless signals using the receivers/transceivers 212-218 or 312-318. In the monitoring process, the mobile device 200 or 102 receives and stores a multitude of samples of the wireless source signals over a given period of time. The collected source signals are processed, either by the mobile device 202 or a remote location system 110. The resulting data includes, for each signal source detected, the device's identification information, such as a MAC or EUI identifier or the signal's frequency; the average and/or RSS signal strength; the standard deviation of its signal strength; and its yield, as defined above.

Once the monitoring has completed at step 502, either an application on the mobile device 200 or a remote location system 110 processes the resulting data to identify a map on which the user is likely to be located database of maps (step 504). The process of selecting a map is described in detail below in relation to FIG. 6. Once the map has been selected at step 504, the location of the mobile device 102 or 200 is determined (step 506). The process of determining the location from the data is described in detail below in relation to FIG. 7.

Lastly, the location is returned to the user 108 (step 508). As seen in the screenshot 400 in FIG. 4, the mobile device 102 or 200 shows the user 108 his location with an indicator 402 on the map 414. The map contains reference information, such the names of stores, company or department names in an office, departments or wings in a hospital, or galleries in a museum.

Figure 6:
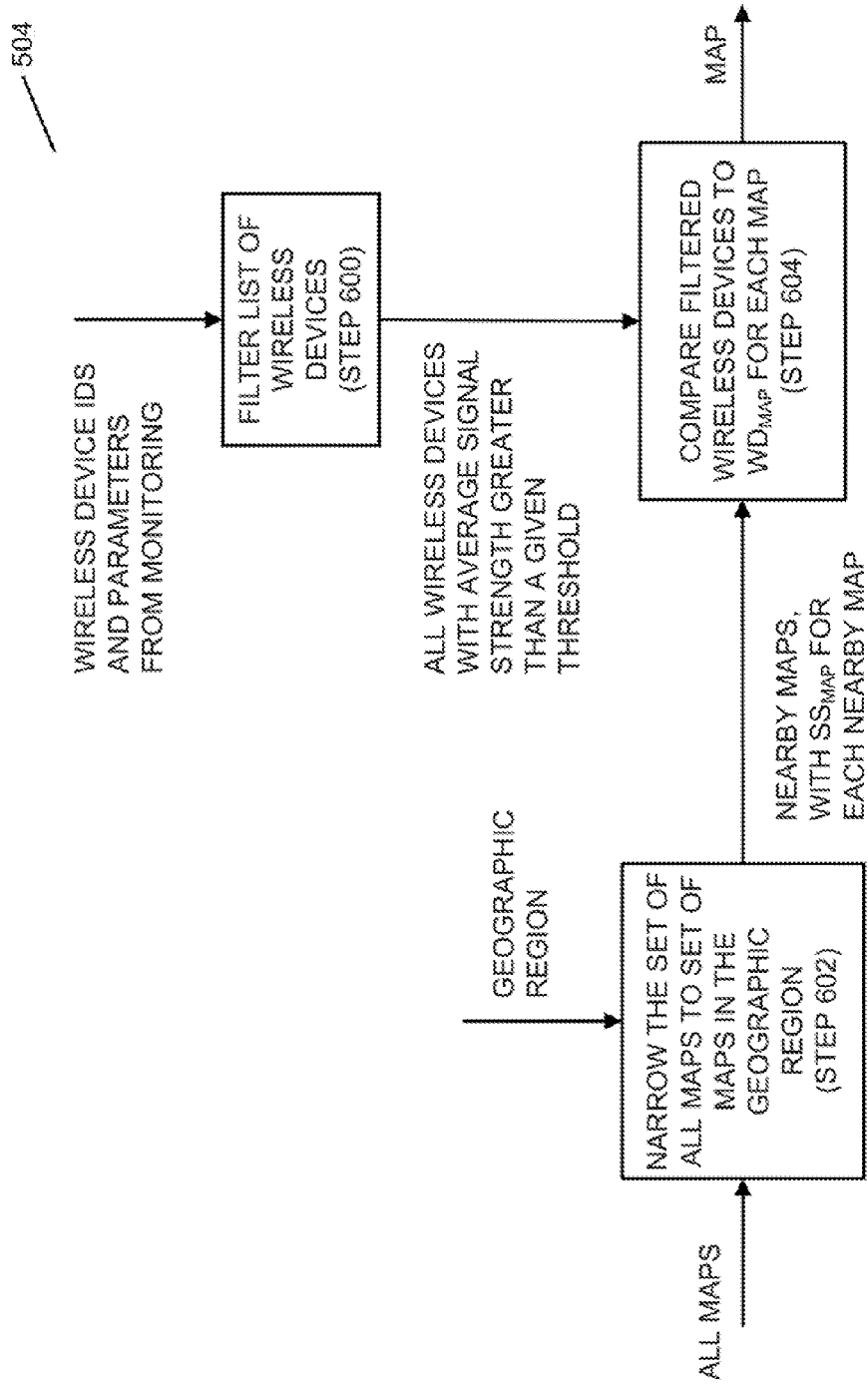
FIG. 6 is a flowchart for a method of determining a map on which a mobile device is, according to an illustrative embodiment of the invention.

FIG. 6 is a flowchart for a method of determining a map on which a mobile device is located (step 504), according to an illustrative embodiment of the invention. The signal source data, as a list of signal source identifiers and parameters, is inputted into a filter. This filter selects the signal sources with parameters, such as average power and yield, above certain thresholds (step 600). For example, the filter may select signal sources with average strengths greater than −65 dB or signal sources with percentage yields higher than 90%. The filter may also filter out certain wireless devices, such as transient mobile devices identified as such by MAC addresses in a given range, which are not reliably present. The output of this filter is a subset of detected signal sources whose signal parameters indicate that the signal sources are near the mobile device. The location system may require that a minimum number of signal sources be output from this filter. In this case, if the number of selected signal sources is below the minimum, at least one of the filter thresholds may be relaxed so the filter outputs an adequate number of signal sources.

Independently, a geographic region of the mobile device is used to narrow down the set of all maps used by the location system (step 602). The geographic region is the approximate location that the mobile device knows that it is in based on a prior GPS reading, cell phone tower triangulation results, location data provided directly to the mobile device by a mobile switching station, or other means. The map database, particularly a map database stored at a remote location, could include map data for locations all over the world. Comparing the data to every map would be time and processor intensive. To improve the process, the geographic region is used to narrow down the set of all maps in the map database to a smaller subset of maps from the region that the mobile device is in. Especially in the case of multi-floor buildings in which each floor is on a separate map, the approximate location is not sufficient to determine which map the mobile device is on.

Alternatively, in the system of FIG. 2 in which the mobile device 200 runs the location application 210 rather than sending data to a remote location and having the location returned, it is undesirable to store an entire map database on the mobile device, particularly if the total number of maps is high. In this case, the geographic region can be used to automatically or upon user prompt update the map database stored on the mobile device to a subset of all known maps. If the user 108 knows in advance where he is going, he can download the needed maps ahead of time.

Each map in the geographic region has associated with it a set of signal sources that can be used for map identification. These signal sources are identified during the training process, which is described in detail below in relation to FIG. 8. In particular, the complete set of devices identified during training on the map is filtered to identify the strongest and most reliable signal sources (e.g. those with a sufficiently high yield parameter, or those who are known to be permanently placed). This filter selects the signal sources with parameters, such as average power and yield, which were above certain thresholds in any test location on the map. This filter and the thresholds are not necessarily the same as those in step 600. The output of this filter for each map, $SS_{map}$, is the set of the signal sources that best define that map. Ideally, this is a set of signal sources that are on that map.

Finally, the list of signal sources received by the mobile device $SS_{received}$ that passed through the filter (step 600) is compared to the list of signal sources $SS_{map}$ associated with the map (step 604). In one implementation, each map is scored, with the score of each map equal to the number of common signal sources in $SS_{received}$ and $SS_{map}$. The chosen map is the one with the highest score. If two or more maps have the same or substantially similar scores (not shown in FIG. 5), step 504 is run again, with at least one filter parameter from step 600 changed. Alternatively, the application may prompt the user to select one of a reduced set of maps.

Figure 7:
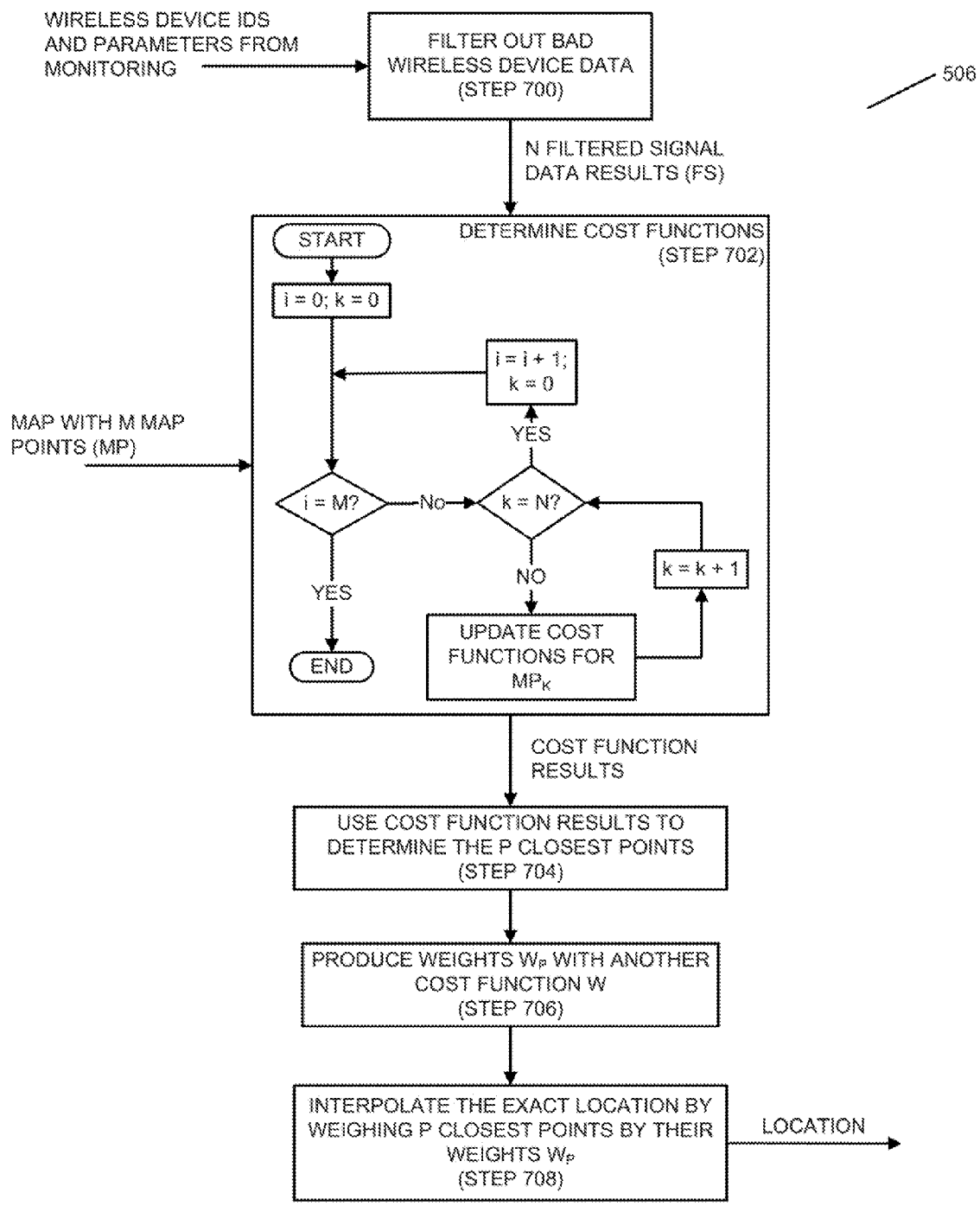
FIG. 7 is a flowchart for a method of determining where a mobile device is on a given map, according to an illustrative embodiment of the invention.

FIG. 7 is a flowchart for a method of determining where a mobile device is on a given map (step 506), according to an illustrative embodiment of the invention. The inputs to the location determiner (step 506) are the signal source data and the map with M defined map points (MPs) each with associated fingerprints obtained in training, which is described in detail with relation to FIG. 8. First, the signal source data is filtered based on parameters meeting certain thresholds, such as average power, standard deviation of power, and yield (step 700). The requirements to pass through this filter could be more complex, for example, passing two thresholds, or passing one of several thresholds at the highest level and the others at a secondary level. One possible filter sets a required power threshold of −85 dBm and a required observation yield of 30%. The filter may also shape the data by adjusting parameters. For example, for signals with high average powers and high standard deviations, the standard deviation may be capped at a certain value, such as 5 dB. The filter may also filter out certain wireless devices, such as transient mobile devices identified as such by MAC addresses in a given range, which are not reliably present.

This filter, which removes weak, unstable, or unreliable signals, returns the data for N signal sources. The signal source data and map are then compared using cost functions (step 702). Each map point (MP) in the map from the database has an associated fingerprint of the signal sources received at that point. These fingerprints are created through initial setup and testing of the indoor location system on the map described further in relation to FIG. 8. In certain embodiments, the fingerprints are updated based on data received from continued testing and user feedback after the system and map have been made public, as described in relation to FIG. 8. Each fingerprint includes a list of signal sources received at that point and the signal characteristics, like average power, standard deviation of power, and yield, for each signal.

The fingerprint of each of M map points of map is compared to each of N filtered data results in the loop shown in step 702. The end product of this loop is a set of cost function values for each of M map points based on the fingerprint data $MP_k$ and collected data. For the collected data of each filtered signal source $FS_i$ the cost function is updated if the signal source $FS_i$ is also a device in the fingerprint of $MP_k$. The cost functions are based on the received signal parameters, such as average power, standard deviation of power, and yield, of the signal source $FS_i$ and similar parameters of the map point $MP_k$. An example cost function is as follows: for each signal source detected, increase one cost function value of the $k^{th}$ map point $MP_k$ by the yield of $FS_i$ multiplied by the yield of $MP_k$ if the average power of $FS_i$ is within a certain range of the average power of $MP_k$ and both $FS_i$ and $MP_k$ have sufficiently low standard deviations of power (eg. <5 dB). While a single cost function could be used in comparing collected data to a map point, using several cost functions provides more robust results.

Once the values of these cost functions have been calculated, another cost function uses the values of the previously calculated cost functions to determine the p most likely map points (step 704). The number of most likely map points returned by this cost function is flexible, which in tests has shown to provide results with less error than if a fixed number of most likely map points is used. In 68 random locations in a large public indoor space, the Cambridgeside Galleria Mall in Cambridge, Mass., an algorithm that returned a flexible number of most likely map points generated results with three to four times greater accuracy than fixed approaches, as shown in Table 1 below:

TABLE 1

| Number of most likely map points found | Average error |
| --- | --- |
| 1 most likely map points | 25.0 m |
| 2 most likely map points | 24.5 m |

TABLE 1-continued

| Number of most likely map points found | Average error |
|---|---|
| 3 most likely map points | 22.5 m |
| Flexible number of most likely map points | 6.6 m |

Once the p most likely map points have been found, another cost function W is used to calculate weights for these points, $w_p$ (step 706). In one possible weight cost function W, the difference between the average signal strength of the received signal and the average signal strength in the map point is found for every signal source. For a signal source in the received set of signals that passes through the aforementioned filter but is absent in the fingerprint associated with a given map point, or conversely, is included in the filtered fingerprint associated with a map point but is absent in the filtered set of received signals, the system generates a dummy signal for the set of received signals or the map point, as appropriate, with a low average signal strength for use in calculating a signal strength difference for the signal source. The value of the weight cost function, $w_p$, for the map point is then calculated as the average of these average signal strength differences. A low $w_p$ indicates that the location of the mobile device is close to the map point. These weights are then used to interpolate the exact location (step 708). As shown in FIG. 5, this location is output to the user 108 though a map in the GUI of the mobile device.

Figure 8:
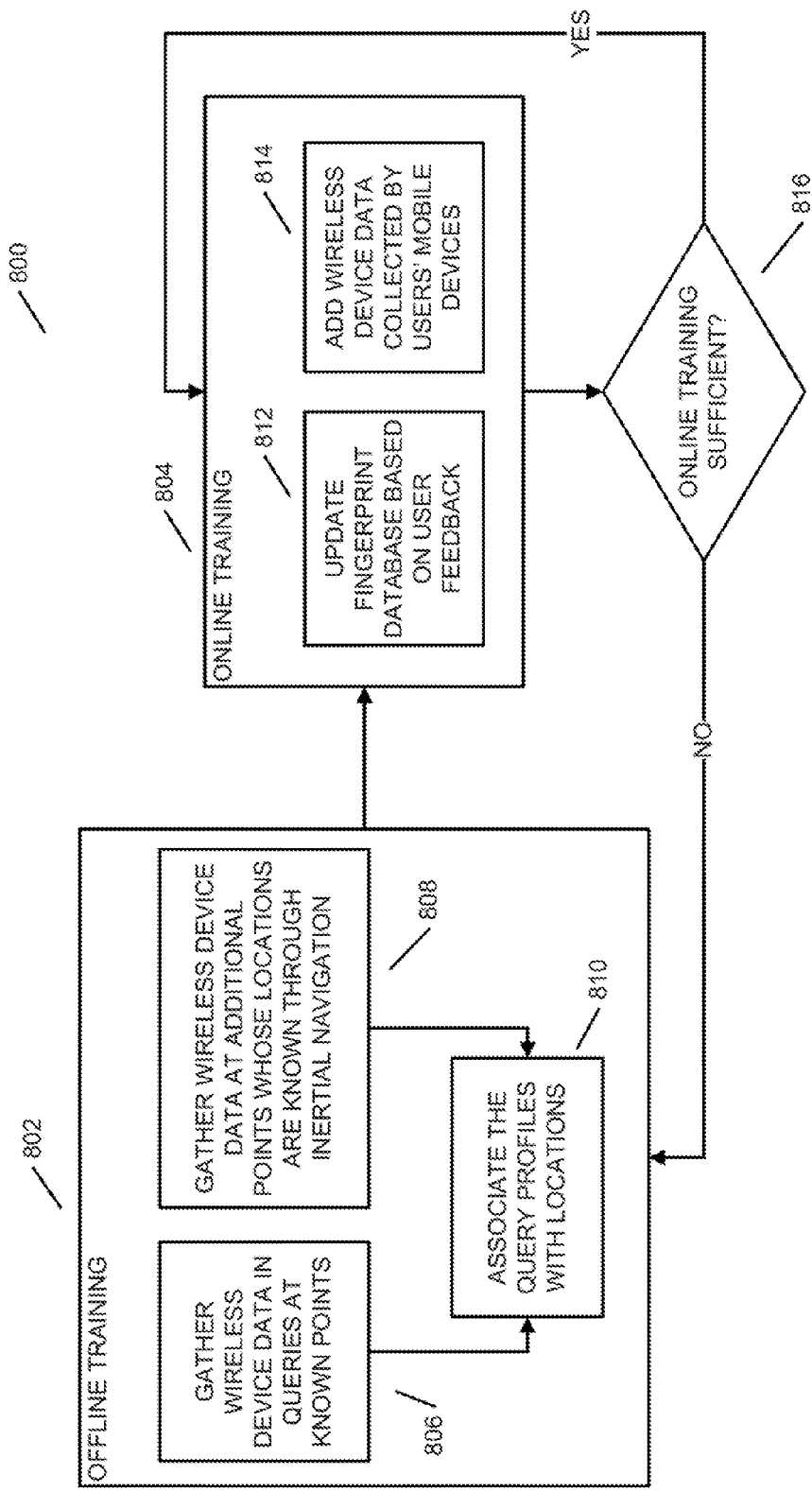
FIG. 8 is a flowchart for a method of training a system of indoor geolocation, according to an illustrative embodiment of the invention.

The fingerprints of the map points are obtained through a training process. FIG. 8 is a flowchart for a method of training a system of indoor geolocation, according to an illustrative embodiment of the invention. The method of training 800 is broken into two main stages: offline training 802 and online training 804. The system administrators must perform some offline training to set up a fingerprint database before users can use the indoor geolocation system. The first element of offline training is gathering signal source data at known points, referred to as "fixed" points (step 806). To do this, a system administrator uses a mobile device to monitor detectable signal sources at an identifiable location on a map, such as at a kiosk or at other fixed infrastructure. These fixed locations line up precisely with a point on a given map to associate the data profiles with locations (step 810).

For all the possible locations in the visitable areas of the map under study, the system defines a grid of location and develops a mesh of grid locations in which a fingerprint can be obtained. For example, the grid could be composed of squares with edges 100 ft. apart. The size of the grid is usually considered a function of desired accuracy and/or desired labor to complete the procedure. The accuracy of the system is greatly dependent on the coverage of the map under study. In other words, the smaller the grid size of the map obtained in the offline phase, the better the accuracy of the system. For locations for which no measurements are taken during the offline training phase, locations can be determined using the interpolation discussed with respect to FIG. 7.

After designing the grid and identifying the locations of the grid on the map under study, the training data can be obtained by collecting data at the specified locations (step 806). The mobile device includes a data collection software application stored on a computer readable medium (e.g., a hard drive or integrated circuit memory) for execution by a processor on the mobile device. The software application displays a map of the area of interest when executed. The map indicates the selected grid locations where measurements are to be taken. In addition, the application includes a user interface for an administrator to indicate that she has reached an identified grid location. In operation, the administrator moves the data collecting device to the specified fixed locations in the mesh and manually collects data. In one embodiment, data collection begins by the administrator, e.g., selecting a location on the map displayed on the mobile device (for example, tapping on the location with a finger or stylus, or by moving a cursor over the location and clicking a button on a user input device). In another embodiment, the administrator merely selects a user interface component (e.g., an icon) or presses a button on a user interface device, instructing the mobile device to begin a measurement process. As discussed further below, the mobile device then determines its location based on a prior known location and tracking data output by an inertial navigation system operating on the device. The monitoring continues for a predetermined period of time, for example 30 or 60 seconds.

With at least one known point identified, the administrator can perform training on points that he does not know exactly by using a reasonably accurate inertial navigation system on the mobile device (step 808). To train using inertial navigation, the administrator should start from a known fixed location on the map under study and collect measurement information that will be associated with that location. Then the administrator can move in any direction for approximately 10 feet and stop. The inertial navigation system captures the new location and hence the monitoring for this new location can immediately start. The data is associated with the location determined through inertial navigation (step 810). This process can be repeated until the map under study is covered. In addition to relying on the inertial navigation system, the trainer can occasionally visit one of the predetermined fixed locations on the map under study and reset the inertial navigation system to remove any inaccuracy of such system. The inertial navigation system can include an accelerometer, gyroscope, or another type of motion sensing devices.

In one hybrid training embodiment, a combination of the above methods is employed. In the hybrid method, the system administrator designates two types of locations on the map, core locations and interim locations. Core locations are clearly identifiable by an administrator and the administrator can reach the exact desired location with a great deal of certainty (e.g., a fixed kiosk or other piece of infrastructure). Interim locations are between core locations for which certainty of location is harder to determine. During the training phase, the administrator indicates via the training application arrival at each core location by selecting the location on the map displayed by the device or by selecting a core location from a drop down box or other menu format. For the interim locations, the administrator, when at or near the location, instructs the device to begin recording without indicating a specific position, allowing the inertial navigation system of the device to determine the device's current position.

At each core location, the training application can recalibrate the results from using the inertial navigation system based on knowledge of arrival at a known position. If upon reaching a core location, the location output by the inertial navigation system varies substantially from the actual location of the core location, an alert can be issued to the administrator to backtrack to obtain new measurements for those previous locations. Alternatively, the known error can be used to correct for the locations associated with prior measurements taken since departing the preceding core location.

As with the mobile device used to perform indoor geolocation, the training device may take several forms, such as a laptop with attached inertial navigation hardware as well as RF signal detectors (for WLAN data, GPS, cellular tower data, etc.) or a smartphone with attached (or internal) inertial navigation as well as RF signal detectors and memory for storing fingerprint data. The device will store RF signals and associated grid data for subsequent transfer via USB. Alternatively, the device may have wireless transmission capabilities for real-time uploading of readings.

After the system has been set up through the offline training 802, online training 804 is used to monitor and improve the map after the system has been deployed and is being used. The online training method 804 uses crowdsourcing, i.e. the collection of additional training data from the users of the system. One element of crowdsourcing is based on user feedback. Referring back to FIG. 4, in the screenshot 400, there are two buttons along the bottom of the screen, "Feedback" 410 and "Correct Location" 412. Both of these are used to collect feedback from the user. After the user is shown his location, he may click the "Feedback" button to enter a scaled rating of the results he received, such as high, medium, or low accuracy. The application may or may not open a new screen from which the user may enter the rating. This information can be used by the system administrator to assess the success of their system. It could also be used to trigger the collection of signal source data (step 814) so that the database can be updated. If the user thinks that the location he received is incorrect, he may move the position arrow 402 to the correct position on the map and click the "Correct Location" button 412 to return this location to the administrator's server. The user can enter his location using a touchpad, directional pad, track ball, optical mouse, or other user interface element. This information can be used by the administrator to update the map database and assess the success of the system.

A second element of crowdsourcing is the automatic collection of signal source data from a user's mobile device (step 814). A wireless signal reading, collection, and transmission application executes on the user's mobile device and sends source signal readings and the user's location information, based on tracking user location with inertial navigation and augmented with GPS and cell tower triangulation location data, to the administrator's servers. Automatic signal source collection may be prompted in any of several ways. For example, a user's mobile device may automatically collect signal source data after the user has used the "Correct Location" feature discussed above. This will check the location that the user has entered by tracking the user's location using the methods listed above and checking this against the location implied by the set of automatically collected data. Alternatively, when the mobile device has been stationary for a given period of time, e.g. 5 minutes, the likelihood of the mobile device to begin moving may be less than the likelihood of a mobile device in motion to continue moving. This provides an opportunity to collect data over a period of time, so the mobile device will be prompted to automatically collect signal source data. Automatically collected data is input into the map database to update or supplement the initial training data. The quality of the data from the users' devices compared to the quality of the data collected in offline training is accounted for when the map database is updated.

At times, the online training 804 alone may not be sufficient to maintain the desired accuracy of the map database. For example, an addition to a building or stores changing hands may necessitate the creation of new fingerprints on the map grid. The system administrator determines if the online training methods discussed above are sufficient to maintain the quality of the map (decision 816) through any of a variety means such as user feedback described above or information about changes made to the indoor environment. If the administrator determines that the online training 804 is sufficient for maintaining the accuracy of the map, the online training 804 continues. If the administrator determines that the online training 804 is not sufficient for maintaining the accuracy of the map, then offline training 802 is performed again.

Figure 9:
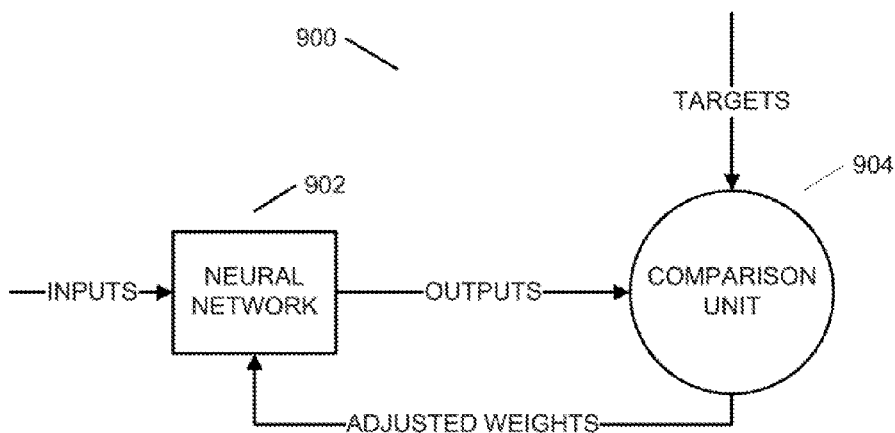
FIG. 9 is a flowchart for a method of training a neural network used for indoor geolocation, according to an illustrative embodiment of the invention.

FIG. 9 is a flowchart for a method of training a neural network used for indoor geolocation, according to an illustrative embodiment of the invention. An alternative method for indoor geolocation includes collecting data for nearby signal sources (step 502), selecting the map (step 504), and using a neural network 902 to determine the mobile device's position on the map.

The inputs to the neural network are formed as a matrix such as $$\begin{bmatrix} ID_1^i, param_1^i, param_2^i, \ldots, param_n^i \\ ID_2^i, param_1^i, param_2^i, \ldots, param_n^i \\ \vdots \\ ID_m^i param_1^i, param_2^i, \ldots, param_n^i \end{bmatrix}$$

with their respective target outputs $(x_i, y_i, map_k)$. The neural network then starts training itself by inputting the input data one by one and adjusting the output to minimize the error between the predicted output $(\hat{x}_i, \hat{y}_i, \hat{map}_k)$ and real target output $(x_i, y_i, map_k)$. The error term is defined as $error_i = |(\hat{x}_i, \hat{y}_i, \hat{map}_k) - (x_i, y_i, map_k)|$.

Figure 10:
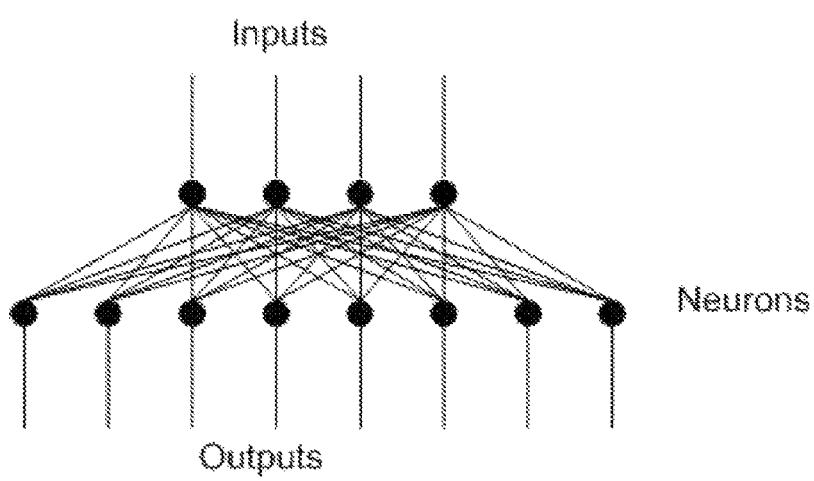
FIG. 10 is a drawing of a neural network, according to an illustrative embodiment of the invention.

The neural network consists of multiple layers of weights and biases. Each layer consists of several adders, multipliers and signal modifiers. As shown in FIG. 9, the inputs are fed to the neural network 902. These inputs are directly connected to a layer of adders and multipliers, referred to as neurons, which are described in FIG. 10. The neurons combine different inputs with adjustable weights and construct the outputs. Each line in FIG. 10 can be interpreted as multiplication by a weight. The outputs are then linear combination of the neuron arithmetic. The system combines the inputs and adds them with some biases. The resulting signals are then moved to another layer. The same procedure takes place in all of the layers until the resulting output is achieved. In every layer, each signal from the previous layer is combined with other signals resulting from the previous layers and a bias is also added to each resulting combination. In each step of FIG. 9, the outputs of the neural network 902 are compared with the target outputs by comparison unit 904 to observe how well the neural network has performed. Based on this performance, the weights and biases of neural network are adjusted and the process is repeated until desirable accuracy is achieved.

This results in mapping of the input to the desired target devices. The mapping can be linear or non-linear. The inputs of the mapping system, i.e. neural network, are the identifiers of the signal sources close by and their respective wireless propagation parameters. The outputs are the recorded coordinates in Cartesian coordinates along with the correct map under study. Other types of inputs and outputs may be used, such as Polar, Ellipsoidal, and Latitude-Longitude coordinates as outputs and delay, TOA, AOA of the wireless channel as inputs. The type of the mapping can also be modified. Any of a variety of types of neural networks can be used, including but not limited to Multi Layer Perceptron (MLP) and Radial Basis Function (RBF). For each network type, the network learns to adjust the weights and biases internally such that the error between the estimated target data and real target data is minimized. The error function is defined as follows:

$$\gamma_1 = \frac{1}{n} \sum_{i=1}^{n} |(\hat{x}_i, \hat{y}_i, \hat{map}_k) - (x_i, y_i, map_k)|$$

Each network type has its own characteristic when implemented in real-time scenarios. Some network types employ a continuous function which enables them to perform better when generalization of the training data to unknown data is needed. Some networks have superior performance when they train with a set of data and are supposed to work with the same set. Such network types are much easier to design and train.

The neural network 902 is then trained by feeding the input to the first layer and letting the network adjust its weights and biases internally to correctly estimate the location of the mobile station. The goal of the training phase, which occurs in the offline phase, is to build a general model for mapping of the inputs in the training data to the output data. The assumption is that there exists a non-linear mapping of all the possible inputs to their respective outputs. The goal of the training phase is to provide a good estimate of such non-linear mapping in a linear or non-linear function which can be generalized to all the possible input fingerprints even if they were not present in the training data.

In the training phase, the system has to consider the fact that the fitting can not be extended for unlimited time. In other words, the network can not be trained infinitely so that it fully matches the training set. This generally results in overfitting the mapping function and underperforming of the system when generalized to unknown fingerprints.

Another important factor in determining the performance of a neural network is the sum of the network biases and weights, or sum of the square of the weights and biases:

$$\gamma_2 = \Sigma |w_i| + \Sigma |b_i|$$

In general, neural networks with small weights and biases are preferred.

The size of the neural network is also an important parameter in determining the performance of a neural network. Larger networks generally have more minimum locations when producing an error surface. Since the goal of the neural network is to find the global minimum of this surface, a large number of minimums implies a lower likelihood of finding the correct minimum, the global minimum.

Considering the above, the system administrator should decide on the type of neural network; the size of the neural network, which includes the number of layers, number of neurons in each layer, and output function of each layer; and performance observation of the neural network. The above parameters can be adjusted for each neural network to observe its performance when the same training data is used as input and, more importantly, when new fingerprint data is added to the database.

The performance of the system can be monitored by observing the sum of the squared error, sum of the squared weights and biases, and a combination of both:

$$\gamma = \alpha\gamma_1 + (1-\alpha)\gamma_2$$

When combined, the neural network performs smoother and is less likely to overfit. This considerably helps the neural network to perform when new data is presented to the neural network.

For better performance, the inputs and outputs of the neural network can be normalized to corresponding values in the interval of [−1 +1]. In such cases, the outputs of the neural network should be denormalized to display the correct coordinates.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A method for determining a user's location within an indoor environment comprising:
   receiving a location request including data related to a set of radio frequency (RF) signals;
   selecting a map from a plurality of maps based on the received data; and
   processing the received data to identify the location of the user on the map,
   wherein at least one of the map selection and the location identification comprises processing the received data based on yield information associated with at least a subset of the set of received signals identified in the requests.

2. The method of claim 1, wherein the yield comprises for a given signal a measure of how often the signal is detected over a period of time.

3. The method of claim 1, wherein the yield comprises for a given signal a measure of how many times the signal is detected over a number of observations.

4. The method of claim 1, wherein selecting a map further comprises:
   filtering the received data to obtain a subset of the data with preferred signal characteristics; and
   comparing the filtered received data to the sets of signal sources associated with the maps.

5. The method of claim 1, wherein filtering the received data and map data sets is based on the average signal strength of the received signals.

6. The method of claim 1, wherein comparing the filtered received data to the filtered map data further comprises calculating a score for each map based on the number of filtered detected wireless signals that are in the filtered set of wireless signals of the map.

7. The method of claim 1, wherein selecting a map further comprises use of the mobile device's approximate location to narrow a set of maps for potential selection to those in the mobile device's region.

8. The method of claim 1, wherein processing the received data to identify the location on the map further comprises the steps of:
   filtering the received data;
   comparing the received data to a map data set including data for a plurality of RF signals at a plurality of locations within the selected map;
   determining a variable number of most probable map points at which the user may be located; and
   finding the location through interpolation of the most probable map points.

9. The method of claim 8, wherein comparing the received data to a map data set further comprises the calculation of at least one cost function for each location within the map.

10. The method of claim 9, wherein the cost functions produced are used to determine a set of most probable map points.

11. The method of claim 8, wherein the most probable map points are assigned weights which are used in the interpolation.

12. The method of claim 1, wherein processing the received data to identify the location on the map comprises processing the received data by a neural network.

13. A non-transitory computer readable medium storing computer executable instructions, which, when executed by a processor, cause the processor to carry out a method for determining a user's location within an indoor environment comprising:
receiving a location request including data related to a set of radio frequency (RF) signals;
selecting a map from a plurality of maps based on the received data; and
processing the received data to identify the location of the user on the map,
wherein at least one of the map selection and the location identification comprises processing the received data based on yield information associated with at least a subset of the set of received signals identified in the requests.

14. The non-transitory computer readable medium of claim 13, wherein the yield comprises for a given signal a measure of how often the signal is detected over a period of time.

15. The non-transitory computer readable medium of claim 13, wherein the yield comprises for a given signal a measure of how many times the signal is detected over number of observations.

16. The non-transitory computer readable medium of claim 13, wherein selecting a map further comprises:
filtering the received data to obtain a subset of the data with preferred signal characteristics; and
comparing the filtered received data to the sets of signal sources associated with the maps.

17. The non-transitory computer readable medium of claim 13, wherein filtering the received data and map data sets is based on the average signal strength of the received signals.

18. The non-transitory computer readable medium of claim 13, wherein comparing the filtered received data to the filtered map data further comprises calculating a score for each map based on the number of filtered detected wireless signals that are in the filtered set of wireless signals of the map.

19. The non-transitory computer readable medium of claim 13, wherein selecting a map further comprises use of the mobile device's approximate location to narrow a set of maps for potential selection to those in the mobile device's region.

20. The non-transitory computer readable medium of claim 13, wherein processing the received data to identify the location on the map further comprises the steps of:
filtering the received data;
comparing the received data to a map data set including data for a plurality of RF signals at a plurality of locations within the selected map;
determining a variable number of most probable map points at which the user may be located; and
finding the location through interpolation of the most probable map points.

21. The non-transitory computer readable medium of claim 20, wherein comparing the received data to a map data set further comprises the calculation of at least one cost function for each location within the map.

22. The non-transitory computer readable medium of claim 21, wherein the cost functions produced are used to determine a set of most probable map points.

23. The non-transitory computer readable medium of claim 20, wherein the most probable map points are assigned weights which are used in the interpolation.

24. The non-transitory computer readable medium of claim 13, wherein processing the received data to identify the location on the map comprises processing the received data by a neural network.

25. A system for determining a user's location within an indoor environment comprising:
a database for storing a plurality of maps in which each map contains a plurality of map points with RF fingerprint data; and
a processor configured for:
receiving a location request including data related to a set of radio frequency (RF) signals;
selecting a map from a plurality of maps based on the received data; and
processing the received data to identify the location of the user on the map,
wherein at least one of the map selection and the location identification comprises processing the received data based on yield information associated with at least a subset of the set of received signals identified in the requests.

26. The system of claim 25, further comprising at least of one receiver or transceiver configured to receive the set of radio frequency signals.

27. The system of claim 26, wherein the at least one receiver or transceiver are collocated with the processor and the database within a mobile device.

28. The system of claim 27, further comprising a memory for storing a graphical user interface for presenting the location to the user.

29. The system of claim 26, wherein the at least one receiver or transceiver is physically separated from the processor and the database, the system comprising a second processor co-located with the at least one receiver or transceiver for initiating a transmission of the location request to the processor via a wireless communication link.

30. The system of claim 28, wherein the graphical user interface is configured to accept a corrected location from the user.

* * * * *